(12) United States Patent
Cobb et al.

(10) Patent No.: US 11,808,293 B2
(45) Date of Patent: Nov. 7, 2023

(54) V-BAND CLAMP

(71) Applicant: BAE Systems Information and Electronic Systems Integration Inc., Nashua, NH (US)

(72) Inventors: John C. Cobb, Stoughton, MA (US); Gary M. Shapiro, Wakefield, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 324 days.

(21) Appl. No.: 17/184,834

(22) Filed: Feb. 25, 2021

(65) Prior Publication Data
US 2022/0268302 A1  Aug. 25, 2022

(51) Int. Cl.
| | |
|---|---|
| F16B 2/08 | (2006.01) |
| F16B 21/06 | (2006.01) |
| F16B 2/10 | (2006.01) |
| F16L 23/08 | (2006.01) |
| B63G 8/00 | (2006.01) |
| F16L 21/06 | (2006.01) |

(52) U.S. Cl.
CPC ............... *F16B 2/08* (2013.01); *B63G 8/001* (2013.01); *F16B 2/10* (2013.01); *F16L 21/065* (2013.01); *F16L 23/08* (2013.01)

(58) Field of Classification Search
CPC ..... F16B 2/00; F16B 2/08; F16B 2/10; B63G 8/00; B63G 8/001; F16L 21/00; F16L 21/065; F16L 23/00; F16L 23/08; F16L 37/00; F16L 37/20; F16L 17/00; F16L 17/06

USPC .............................................. 114/312; 24/273
See application file for complete search history.

(56) References Cited

U.S. PATENT DOCUMENTS

| | | | |
|---|---|---|---|
| 2,269,664 | A | 1/1942 | Hallerberg |
| 2,653,836 | A | 9/1953 | Christophersen et al. |
| 2,841,420 | A | 7/1958 | Woolsey et al. |
| 3,861,723 | A | 1/1975 | Kunz et al. |

(Continued)

FOREIGN PATENT DOCUMENTS

| | | |
|---|---|---|
| CN | 106678462 | 5/2017 |
| DE | 202015102398 | 6/2015 |
| GB | 1430320 | 3/1976 |

OTHER PUBLICATIONS

International Search Report, PCT/US22/17479, dated Jul. 5, 2022, 16 pages.

(Continued)

*Primary Examiner* — Lars A Olson
(74) *Attorney, Agent, or Firm* — Finch & Maloney PLLC; Gary McFaline

(57) ABSTRACT

A V-band clamp includes first and second clamp sections each having an arcuate shape with a first end, a second end, and inside surface defining a recessed channel. A hinge pivotably connects the second end of the first clamp section to the first end of the second clamp section. At least one fastener is configured to releasably connect the first end of the first clamp section to the second end of the second clamp section in a closed position. When the V-band clamp is in the closed position, each fastener extends through an opening in an end face on the first end of the first clamp section and into a bore in an end face on the second end of the second clamp section.

12 Claims, 9 Drawing Sheets

(56) References Cited

U.S. PATENT DOCUMENTS

| | | | |
|---|---|---|---|
| 4,915,418 A * | 4/1990 | Palatchy | F16L 17/04 24/284 |
| 5,645,303 A | 7/1997 | Warehime et al. | |
| 10,337,814 B1 * | 7/2019 | Shaker | F41A 15/22 |
| 2005/0264010 A1 | 12/2005 | Wagner | |
| 2013/0174384 A1 | 7/2013 | Ignaczak et al. | |
| 2015/0226352 A1 | 8/2015 | Oyen et al. | |
| 2015/0375840 A1 | 12/2015 | Stowers | |

OTHER PUBLICATIONS

4 State Trucks.com, "Steel V-Band Clamp For 3306 CAT Engines," available at https://www.4statetrucks.com/exhaust/semi-truck-steel-v-band-clamp-for-3306-cat-engines-replaces-iw2431_219714.asp?gclid=EAlaIQobChMImt (accessed Nov. 23, 2020).

Clampco Products, "Clampco Products 1-1/2" V-Band Clamp S.S. Aerospace, Exhaust Torque 45 99625-021," available at https://fazziosurplus.com/clampco-products-1-1-2-v-band-clamp-ss-aerospace-exhaust-torque-45-99625-0210-ajt109 (accessed Nov. 23, 2020).

GlobalIndustrial.com, "Couplings & Shaft Collars," available at https://www.globalindustrial.com/c/motors/collars/power-transmission-collars (accessed Dec. 2, 2020).

Grainger, "Climax Metal Products—Black Oxide Steel Shaft Collar," available at https://www.grainger.com/search?searchQuery=climax+metal+products+Item+%23+29NW14&searchBar=true (accessed Dec. 2, 2020).

AMAZON.com, "HFS Stainless Steel 304 Quick Release V-Band Turbo Downpipe Clamp (3 IN)," available at https://www.amazon.com/HFS-Stainless-Release-V-Band-Downpipe/dp/B01IWZ2ANO/ref=asc_df_B01IWZ2ANO/?tag=hyprod-20&linkCode=df0&hva%E2%80%A6 (accessed Jun. 22, 2020).

VidarJewelry.com, "Hinged Wedding Band Black Gold Tire Tread Diamond Ring," available at www.vidarjewelry.com (accessed Dec. 2, 2020).

\* cited by examiner

V-BAND CLAMP

TECHNICAL FIELD

The present disclosure relates generally to clamping assemblies and more specifically to a V-band clamp suitable for use on an underwater vehicle.

BACKGROUND

A clamp can be used to secure cylindrical connections in vacuum system components and other joints that require an air-tight or water-tight seal. For example, adjacent sections of a vacuum tube each have an annular flange that can be drawn against the flange on the other component. A clamp can be installed around the abutted flanges to hold them together with the flanges received in a slot defined in sections of the clamp. Such clamps may have two curved sections that are fastened together on one side and include a toggle fastener between the clamp sections on the opposite side. The toggle fastener may be a bolt that can be pivoted so that the head of the bolt engages a catch on one of the clamp sections. Tightening the bolt against the catch tightens the clamp around the flanges and draws together the flange faces.

BRIEF DESCRIPTION OF THE DRAWINGS

In FIG. 11A, interfaces between the sections are distinct components that attach to the respective cylindrical section. In FIG. 11B, the interfaces are integral to the sections of the underwater vehicle.

Figure 1:
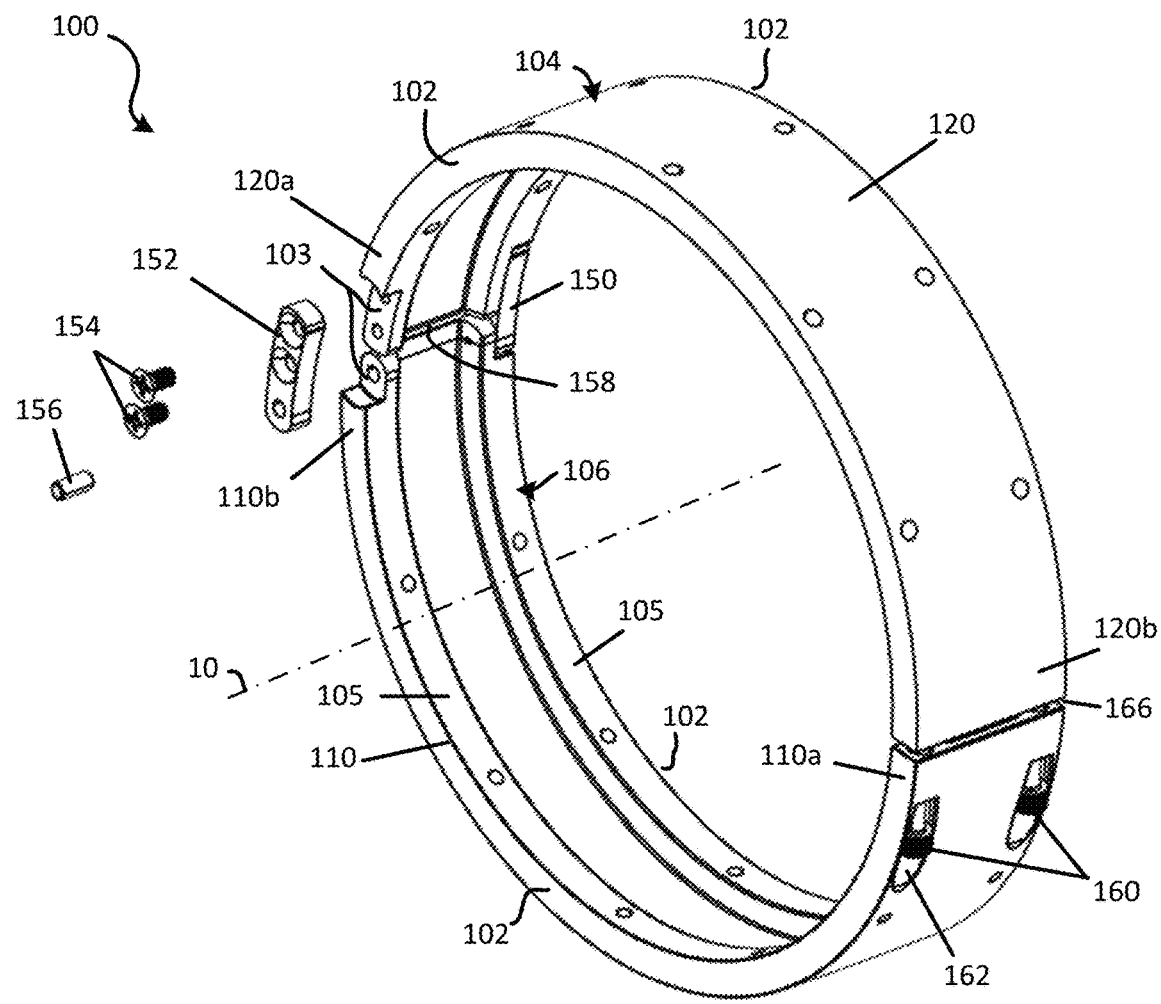
FIG. 1 is a partially exploded, perspective illustration of a V-band clamp in a closed position, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

In accordance with an embodiment of the present disclosure, a V-band clamp is configured to be installed on a joint between adjacent portions of an underwater vehicle. In one example, the clamp includes a plurality of arcuate sections that are hinged together in a single assembly. Open ends of the V-band clamp can be secured together to form a closed band around a cylindrical joint. In one example, the V-band clamp includes two semicircular sections of approximately equal circumferential length. A hinge connects adjacent ends of the clamp sections and allows the sections to be pivoted between open and closed positions. Inside faces of the clamp sections define a channel that is configured to receive flanges or interfaces on adjacent sections of an underwater vehicle. When the V-band clamp is installed on the joint, one or more fasteners extending in a tangential direction can be used to secure the clamp in a closed position. For example, fasteners extend between free ends of the V-band clamp, and when tightened, draw the clamp sections together in a closed shape around the joint.

In accordance with some embodiments, each fastener can be installed in a pocket hole that extends through an end face of one clamp section and into an opening in the end face of the other clamp section. In some such embodiments, the fasteners are retained in the pocket hole by way of a threaded end that is larger than the smooth fastener shaft. When the fasteners are tightened to secure the clamp in the closed position, the fastener head is received in the pocket hole. Accordingly, the fastener does not protrude beyond the outside surface of the clamp. The hinge between sections of the V-band clamp can be made flush with inside, outside, and/or lateral faces of the V-band clamp.

The V-band clamp according to the present disclosure can be configured for installation on a cylindrical joint or a joint having an oval or other rounded cross-sectional shape. When installed on an underwater vehicle, for example, the outside surface of the clamp, including fasteners and hinges, can be made flush or recessed with respect to the outside surfaces of the adjacent sections being joined. Accordingly, the V-band clamp can reduce frictional drag on the underwater vehicle compared to existing designs. As will be appreciated in light of this disclosure, reference herein to an underwater vehicle refers to a vehicle configured for underwater travel. The vehicle may be manned or unmanned, and may be, for instance, a submarine or exploratory vehicle, or a guided or unguided projectile. To this end, the vehicle may include a payload that is non-lethal (e.g., imaging gear, data collection gear, supplies, etc.) or lethal (e.g., explosives, etc.). Numerous variations and embodiments will be apparent in light of the present disclosure.

General Overview

Existing V-band clamps used for vacuum connections, automotive applications and other uses include hardware and hinge assemblies that protrude radially beyond the outside surface of the clamp. When used on a vacuum hose connection in a laboratory setting or on an exhaust pipe connection, such a design may be acceptable to facilitate use of tools and access to the clamp. However, when clamp is used to secure sections of an underwater vehicle, for example, protruding fasteners and hinges increase the aerodynamic drag on the vehicle. Shaft collars have been designed with two separate semicircular portions that can be fastened together with machine screws extending between ends of each section, reducing the overall size of the collar. However, existing shaft collars include multiple individual components that easily separate from one another when the collar is not installed, such as an assembly including separate collar sections and loose fasteners. The separate components of such a collar complicate assembling the collar to its intended location, particularly when installed underwater or in an environment with little free space. When existing clamps are used to join sections of an underwater vehicle, protruding fasteners and protruding hinges increase the aerodynamic drag as the vehicle moves through water. Clamps involving individual components complicate installation, especially in an underwater environment. For example, more than one person may be required to place and hold together clamp sections, place and hold together vehicle sections, and install multiple fasteners into the clamp at the same time, all while working underwater.

The present disclosure addresses these and other challenges by providing a V-band clamp configured for use on an underwater vehicle. In one example, a rigid hinge between semicircular clamp sections enables movement of the clamp between open and closed positions while maintaining proper alignment of the sections. As a result, fasteners are aligned with fastener openings when the clamp is moved to the closed position. A V-band clamp with such a hinge also reduces the number of fasteners needed to secure the clamp in a closed position and simplifies handling the clamp since it is a single assembly.

In some embodiments, screws in the first end of one clamp section can be retained captive in pocket holes so they are ready to engage fastener openings in the end of the other open end of the clamp. Captive fasteners simplify handling required to start a fastener as well as reduce or eliminate the chance of dropped or lost fasteners. In one example, each captive fastener can have a threaded end portion of the shaft that prevents the fastener from escaping the pocket opening and separating from the clamp section.

Additional embodiments and advantages will be apparent in light of the present disclosure.

Example Embodiments

FIG. 1 illustrates a perspective view of a V-band clamp 100 in a closed position with some components of a hinge 150 shown disassembled from the band, in accordance with an embodiment of the present disclosure. The V-band clamp 100 includes a first clamp section 110 and a second clamp section 120 connected to one another by a hinge 150. In this embodiment, the hinge 150 connects the second end 110*b* of the first clamp section 110 to the first end 120*a* of the second clamp section 120 so that the clamp sections 110, 120 can pivot about the hinge 150 with respect to one another and with respect to a central axis 10 through the V-band clamp 100. In the closed position, such as shown in FIG. 1, the V-band clamp 100 substantially defines a closed circle or hoop of rounded shape that is continuous except for a small circumferential gap 166 between adjacent ends of the first and second clamp sections 110, 120.

In the example of FIG. 1 the V-band clamp 100 includes two clamp sections 110, 120. In other embodiments, the V-band clamp 100 can have three, four or other number of clamp sections that include a first clamp section and a last clamp section linked or otherwise connected together. In such embodiments, the first end of one clamp section is movably joined (e.g., by a hinge) to the second end of an adjacent clamp section to permit converting the V-band clamp 100 between open and closed positions and facilitate installation on and removal from a joint. The V-band clamp 100 of the present disclosure is not limited to a circular geometry when closed, and similarly can be configured to be installed on a joint of oval, elliptical, or other rounded geometry, as will be appreciated.

The first end 110*a* of the first clamp section 110 and the second end 120*b* of the second clamp section 120 (or last clamp section) are releasably connected by one or more fasteners 160. In this example, the first clamp section 110 and second clamp section 120 each have a semicircular geometry, accounting for intentional or unintentional gaps between adjacent first end 110*a* and second end 120*b* when closed. Example fasteners 160 are discussed in more detail below.

The hinge 150 includes hinge plates 152 positioned along and secured to opposite lateral sides of the first and second clamp sections 110, 120. The hinge plates 152 are positioned and dimensioned to approximate a continuous band of consistent axial width and consistent radial thickness at the location of the hinge plates 152. In combination with a relatively small circumferential gap 158 between first and second clamp sections 110, 120, hinge plates 152 enable the V-band clamp 100 to apply continuous pressure to a joint along all or substantially all of the circumferential length of the V-band clamp 100. This in turn reduces leaks in the joint.

Each hinge plate 152 can be fixedly attached with fasteners 154 (e.g., with recessed machine screws) to the second end 110*b* of the first clamp section 110, and pivotably secured with a hinge pin 156 (e.g., a dowel pin or screw) to the first end 120*a* of the second clamp section 120, or vice versa. As such, the second clamp section 120 can pivot between open and closed positions of the V-band clamp 100 yet can rigidly secure a joint due to the fixed connection with part of each hinge plate 152. In other embodiments, each hinge plate 152 is pivotably attached to both the second end 110*b* of the first clamp section 110 and the first end 120*a* of the second clamp section 120 (or adjacent ends of other clamp sections as the case may be). Other types of attachment methods can be used between hinge plates 152 and clamp sections 110, 120, whether fixed or movable, and including welding, machine screws, rivets, and pins.

In this example, adjacent ends of the first and second clamp sections 110, 120 are retained in close proximity by the hinge plates 152. A small circumferential gap 158 between the second end 110*b* of the first clamp section and first end 120*a* of the second clamp section 120 is bridged by the hinge plates 152 extending along lateral faces 102. By bridging the circumferential gap 158, the V-band clamp 100 can maintain contact with a joint surface along the entire location of the hinge 150.

The lateral faces 102 of the first and second clamp sections 110, 120 define a recess 103 to accommodate the hinge plates 152. Accordingly, the hinge plates 152 can be substantially flush with the lateral faces 102 of the clamp sections 110, 120 so as to provide generally continuous lateral faces 102 around the circumference of the V-band clamp 100. Hinge plates 152 also can be dimensioned consistently with the lateral faces 102 of the V-band clamp 100 so that the hinge plates 152 are flush with substantially flush with the inside face 106 and/or the outside face 104 of the V-band clamp 100. For example, surfaces of the hinge plates 152 and corresponding faces 102, 104, 106 of the clamp sections 110, 120 are within ±2 mm, within ±1 mm, within ±0.2 mm, or within ±0.1 mm. As a result, the hinge 150 of the V-band clamp 100 simulates a continuous inside face 106, outside face 104, and lateral faces 102. Additionally, with minimal or no protrusion from components of the hinge 150, the V-band clamp 100 as a whole can be substantially flush with or recessed with respect to the outer surfaces of adjacent sections of a joint when installed, depending on the overall diameter of the V-band clamp 100 and required tolerances.

In other embodiments, the hinge plate 152 can be integral to the first clamp section 110 or can be omitted altogether. For example, the hinge 150 can employ overlapping portions of the first and second clamp sections 110, 120 that can be pivotably connected with hinge pins 156 on opposite lateral sides of the hinge 150 or by a single hinge pin 156 extending axially through both sides of the hinge 150. In yet other embodiments, the hinge 150 is or includes a deformable linkage, a region of reduced thickness along a single continuous band or clamp section, or a structure that otherwise permits moving the clamp sections 110, 120 between open and closed positions. Numerous embodiments and variations will be apparent in light of the present disclosure.

In the example shown in FIG. 1, the first end 110a of the first clamp section 110 and the second end 120b of the second clamp section 120 can be releasably connected and tightened together using fasteners 160 oriented generally in a circumferential or tangential direction. In this example, two fasteners 160 are shown, but a single fastener 160 or more than two fasteners 160 can be used as needed for a particular application or a particular lateral width of the V-band clamp 100, as will be appreciated. Each fastener 160 is installed through pocket holes 162 in the first clamp section 110 so that the fasteners 160 engage fastener openings 114 extending into the end face 126 of the second end 120b of the second clamp section 120, or vice versa. Fasteners 160 are discussed in more detail below.

Figure 2:
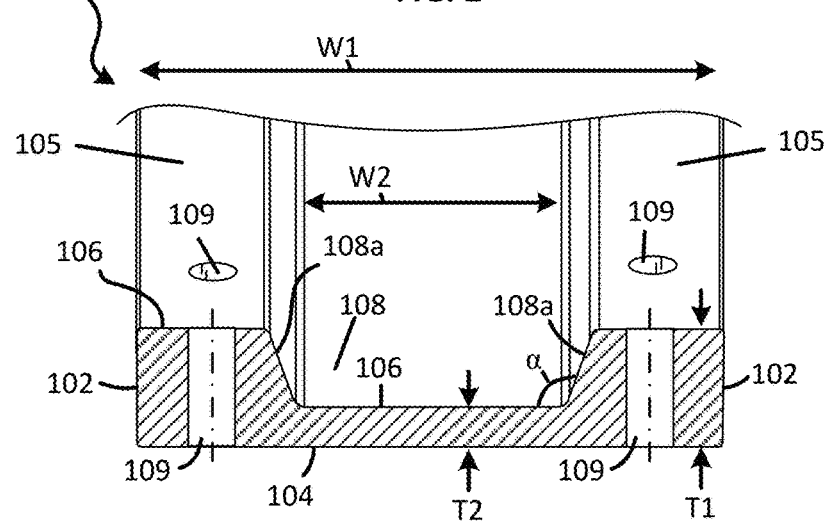
FIG. 2 is a cross-sectional view of a clamp section, in accordance with an embodiment of the present disclosure.

FIG. 2 shows a cross-sectional view showing part of a V-band clamp 100, in accordance with an embodiment of the present disclosure. As noted above, the V-band clamp 100 has a hoop shape in its closed configuration, in accordance with some embodiments. The outside face 104 has a linear profile and the inside face 106 defines a channel 108 positioned between opposite lateral faces 102. In some embodiments, the channel 108 is centered between the opposite lateral faces 102, but this is not required in all embodiments. Sides 108a of the channel 108 define an obtuse angle α with the inside face 106 between the sides 108a. In some embodiments, the angle α is from 100-130°, including 105-115°, 110-120°, 115-130°, 110°, and 120°.

The V-band clamp 100 optionally defines a plurality of fastener openings 109 extending in a radial direction part way through (e.g., a blind bore) or completely through the V-band clamp 100 (e.g., a through bore). Fastener openings 109 are defined in lateral portions 105 of the clamp between the channel 108 and the lateral face 102 where the clamp sections have an increased radial thickness. The fastener openings 109 can be used for mounting accessories to the V-band clamp 100. In some such embodiments, the fastener openings 109 are threaded along all or part of the fastener opening 109. In some embodiments, each fastener opening 109 can be a combination of concentric bores of different diameters, such as to accommodate threaded and smooth portions of the fastener opening 109. In one embodiment, fastener openings 109 are distributed around the circumference of the V-band clamp 100 with consistent or inconsistent spacing. For example, fastener openings 109 are spaced every 15-60°, such as every 20°, every 30°, or every 45°. In other embodiments, fastener openings 109 are positioned only along part of the circumference, may have an irregular circumferential spacing, or may define a hole pattern specific to a particular component to be mounted to the V-band clamp 100, for example. Numerous variations and embodiments will be apparent in light of the present disclosure.

In some embodiments, the V-band clamp has an overall radial thickness T1 of 8-12 mm, such as about 10 mm, and a channel thickness T2 in the channel 108 from 2-8 mm, such as 3-5 mm, or about 4 mm. The overall lateral width W1 is from 40-60 mm, including 45-55 mm, and about 50 mm. The channel 108 has a channel width W2 (measured along the inside face 106) that is 40-60% of the overall lateral width W1, including 45-55%, or about 50% of the overall lateral width W1. In one example, the overall lateral width W1 is about 50 mm, the channel width W2 is about 22 mm, the overall thickness T1 is about 10 mm, the channel thickness T2 is about 3.8 mm, and angle α is about 110°. Fastener openings 109 have a diameter from 2-6 mm, such as about 5 mm. When made of anodized aluminum, titanium, stainless steel or similarly rigid materials, some such embodiments of the V-band clamp 100 have sufficient structural rigidity to securely clamp adjacent sections of an underwater vehicle with a water-tight seal.

Figure 3:
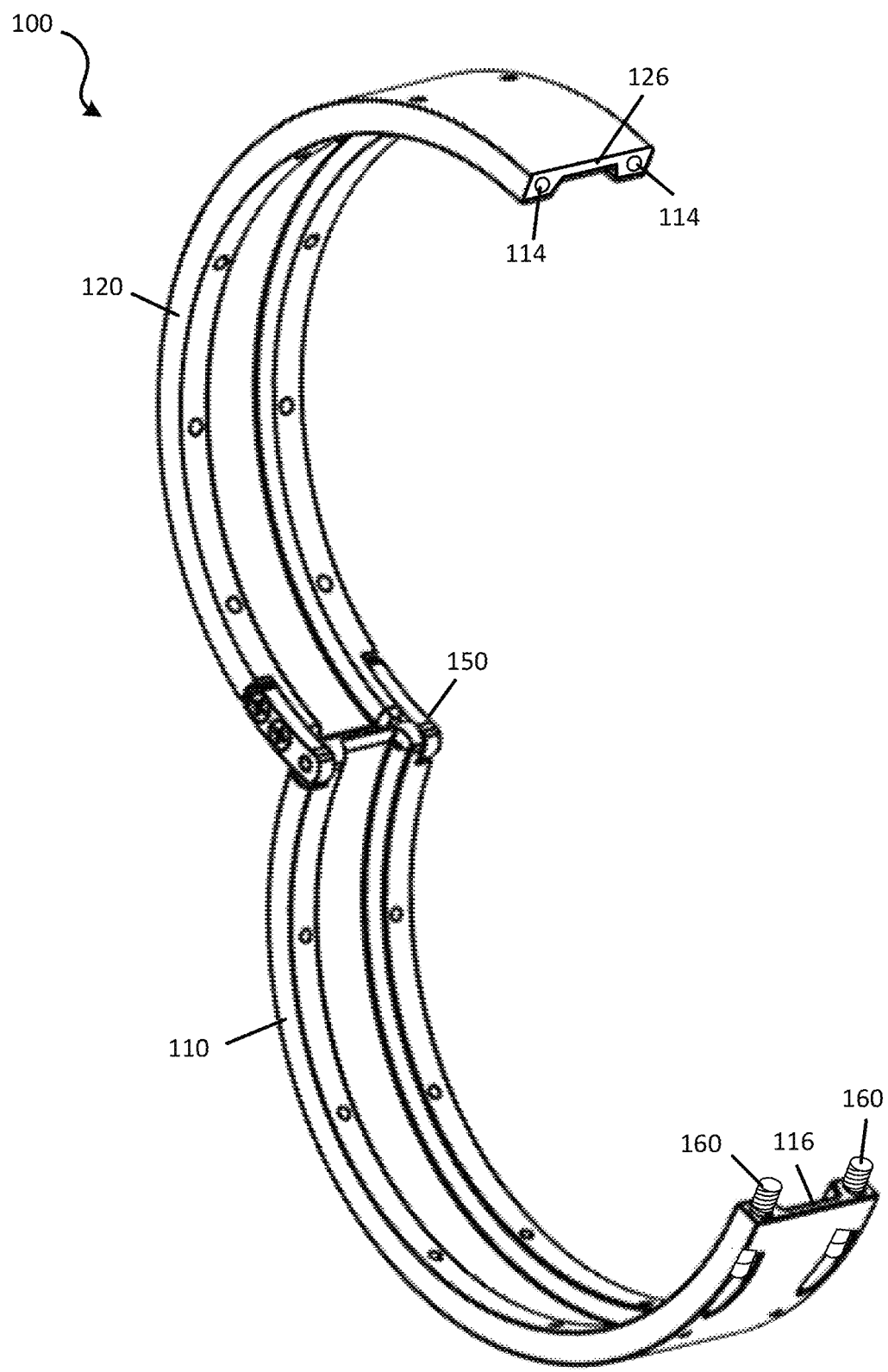
FIG. 3 is a perspective view of a V-band clamp in an open position, in accordance with an embodiment of the present disclosure.

FIG. 3 is a perspective view of the V-band clamp 100 of FIG. 1 shown in an open position, in accordance with an embodiment of the present disclosure. Here, the fasteners 160 have been disengaged from fastener openings 114 in the end face 126 of the second clamp section 120, allowing the first clamp section 110 to pivot about hinge 150 with respect to the second clamp section 120. Optionally, fasteners 160 are retained in a position so that ends of fasteners 160 protrude through the end face 116 of the first clamp section 110, ready to engage the fastener openings 114 in the second clamp section 120 (or last clamp section) when the V-band clamp is returned to a closed position.

Figure 4:
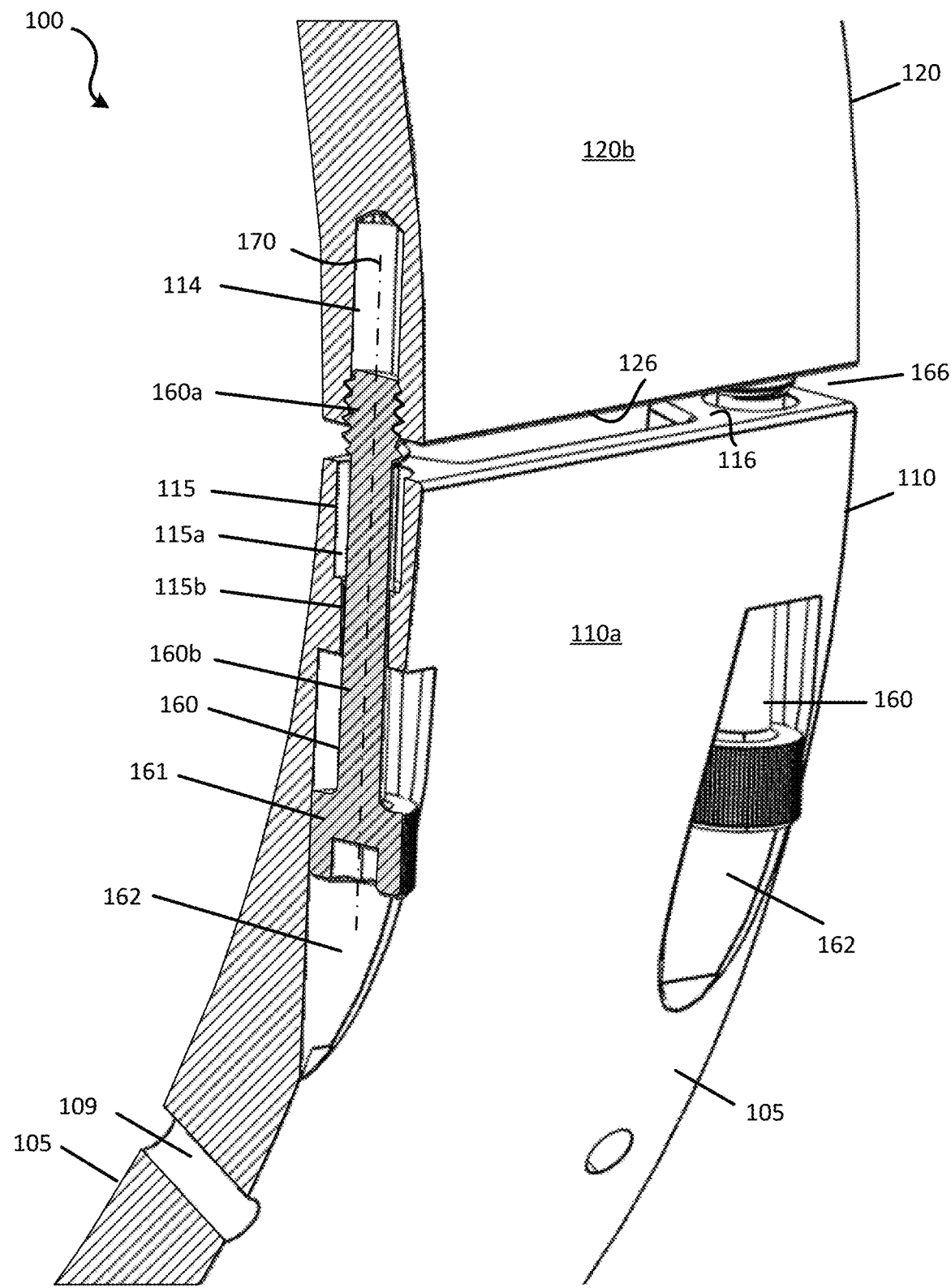
FIG. 4 is a perspective view of adjacent clamp sections of a V-band clamp and shows a cross section taken through a fastener and sections of the V-band clamp, in accordance with an embodiment of the present disclosure.

FIG. 4 illustrates a cross-sectional view showing the first end 110a of the first clamp section 110 and the second end 120b of a second clamp section 120 (or last clamp section) of a V-band clamp 100, in accordance with an embodiment of the present disclosure. In FIG. 4, the section is taken through a fastener 160 and the corresponding pocket hole 162 and fastener opening 114. Each fastener 160 extends through a first fastener opening 115 in the first end 110a of the first clamp section 110 and into a second fastener opening 114 in the second end 120b of the last clamp section (e.g., second clamp section 120). Due to the increased thickness at lateral portions 105, fastener openings 114, 115 can be defined through lateral portions 105 of the clamp sections 110, 120. The fastener head 161 is larger than the fastener's smooth shaft portion 160b and occupies a pocket hole 162 that is continuous with the first fastener opening 115. Note that first fastener opening 115 includes a larger first portion 115a and a smaller second portion 115b, where the smaller second portion 115b is between the larger first portion 115a and the pocket hole 162. The pocket hole 162, first fastener opening 115, and second fastener opening 114 are coaxially arranged along a bore axis 170 that is normal to the end faces 116, 126.

In this example, first fastener opening 115 includes a first portion 115a of a first diameter and a second portion 115b of a smaller second diameter, where the second portion 115b is between the pocket hole 162 and the first portion 115a. The first portion 115a is sized to clear the threads on the threaded portion 160a of the fastener 160 and to allow free axial movement of the threaded portion 160a. The second portion 115b is sized to clear the smooth shaft portion 160b of the fastener 160 and to allow free axial movement of the smooth shaft portion 160b between the threaded portion 160a and the fastener head 161. In some such embodiments, the second portion 115b is threaded consistent with the threaded portion 160a of the fastener 160. As such, the threaded portion 160a of the fastener 160 can be advanced through the threaded second portion 115b of the first fastener opening 115 so that the fastener 160 is retained by the second clamp section 120 even when the fastener 160 is not engaged in the second fastener opening 114 in the second clamp section 120, and still allowing the fastener 160 to be removed from the first clamp section 110 if desired. Captive fasteners 160 have the advantage of reducing or eliminating the use of incorrect fasteners and loss of fasteners. Captive fasteners 160 also facilitates installation of the V-band clamp 100 by reducing the amount of handling necessary to install a fastener 160 when the V-band clamp 100 is in the closed position.

In some embodiments, the V-band clamp 100 has a circumference that is slightly smaller than the corresponding joint on which it is intended to be installed. For example, the V-band clamp 100 has a circumference between 99-100% of the corresponding joint circumference. In such an embodiment, the first end 110a of the first clamp section 110 and the second end 120b of the second clamp section 120 (or last clamp section) define a circumferential gap 166 when the V-band clamp 100 is tightened around the joint. In one example, the V-band clamp 100 is configured for installation on a joint between cylindrical sections of an underwater vehicle, where the joint has an outer diameter of about 15 cm, 20 cm, 25 cm, 30 cm, or some other size. In some such embodiments, the circumferential gap 166 is from 0.5-3 mm when fully tightened around the joint, including 1-2 mm, 1.2-1.8 mm, at least 0.2 mm, at least 0.5 mm, at least 1.0 mm, at least 2 mm, not more than 5 mm, not more than 4 mm, not more than 3 mm, and not more than 2 mm. The circumferential gap 166 allows the V-band clamp 100 to be tightened around the joint with the necessary clamping force and without being limited by contact of the first and second clamp sections 110, 120.

Figure 5:
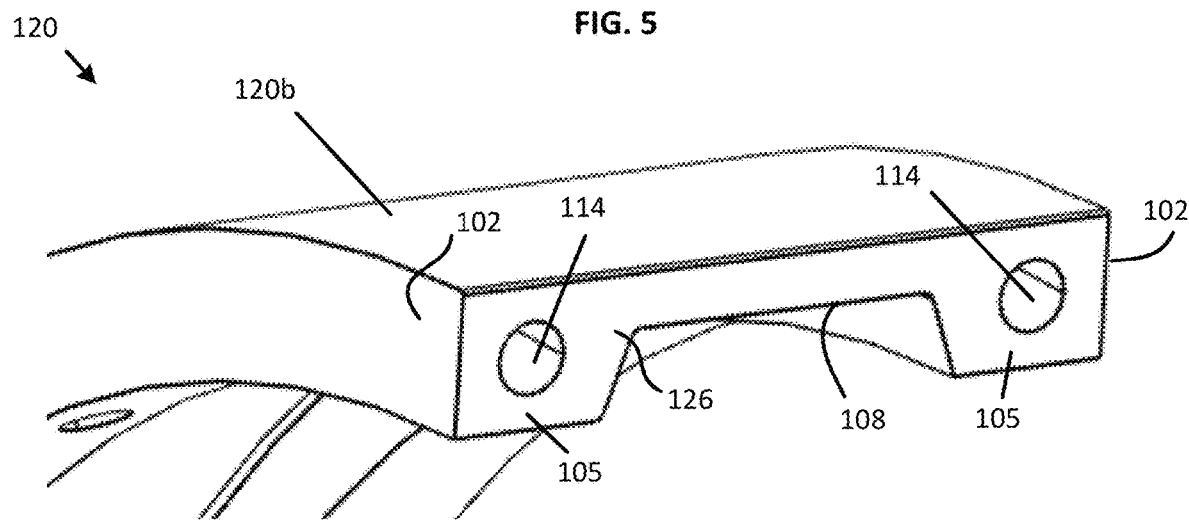
FIG. 5 is a perspective view showing an end face of a clamp section, in accordance with an embodiment of the present disclosure.

FIG. 5 illustrates a perspective view showing second end 120b of second clamp section 120, in accordance with an embodiment of the present disclosure. In this example, fastener openings 114 extend into end face 126 in a direction normal to the end face 126. Each fastener opening 114 is defined in a lateral portion 105 of the second clamp section 120 between the channel 108 and the adjacent lateral face 102. In FIG. 5, fastener openings 114 are illustrated as being smooth bores, but the fastener openings 114 are typically threaded along at least a portion of the fastener opening 114.

Figure 6:
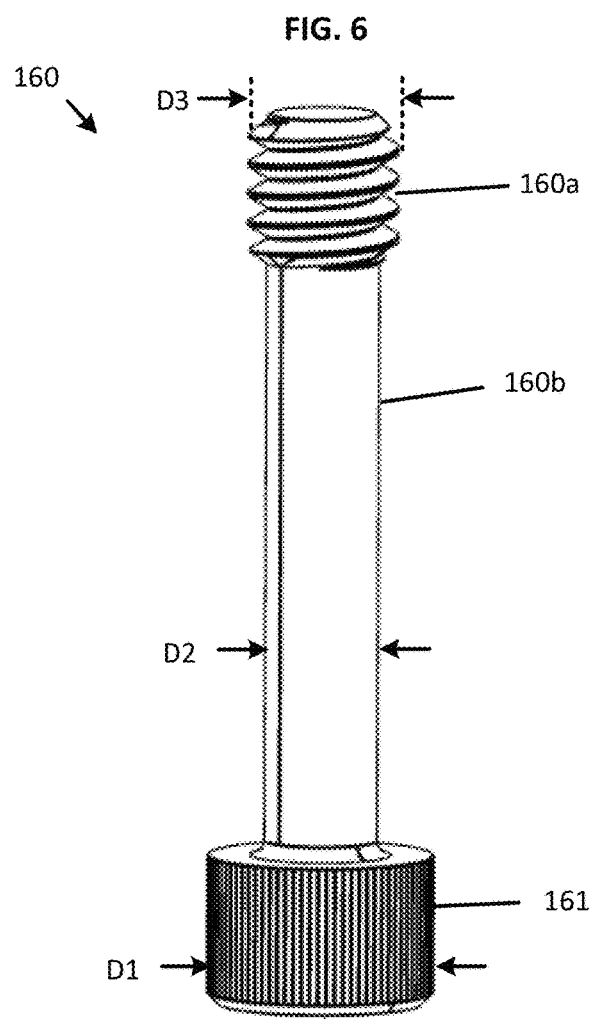
FIG. 6 is a side view of a fastener useful to secure a clamp assembly in a closed position, in accordance with an embodiment of the present disclosure.

FIG. 6 illustrates a side view of a fastener 160 used to connect adjacent clamp sections, in accordance with an embodiment of the present disclosure. The fastener 160 includes a fastener head 161 and a threaded portion 160a on opposite ends of a smooth shaft portion 160b. The fastener head 161 has a first diameter D1, the smooth shaft portion 160b has a second diameter D2, and the threaded portion 160a has a third diameter D3. In one example, D1 is greater than D2 and D3 is greater than D2, where D3 is measured as the outside thread diameter. The threaded portion 160a has a length suitable to extend between and connect the first and second clamp sections 110, 120, such as described above, with the threaded portion 160a engaging the fastener opening 114 in the second clamp section 120. The fastener 160 can be advanced to tighten the V-band clamp 100 around a joint on which it is installed, where tightening may include drawing together clamp sections such that the inside face 106 of V-band clamp 100 contacts the corresponding outside surface face of the joint along all or substantially all of its circumference. For example, when installed on a cylindrical joint with abutting flanges, the inside face 106 makes contact with the joint along at least 50%, at least 60%, at least 70%, at least 80%, at least 90%, at least 95%, at least 98%, at least 99% of the circumference of the joint.

Figure 7:
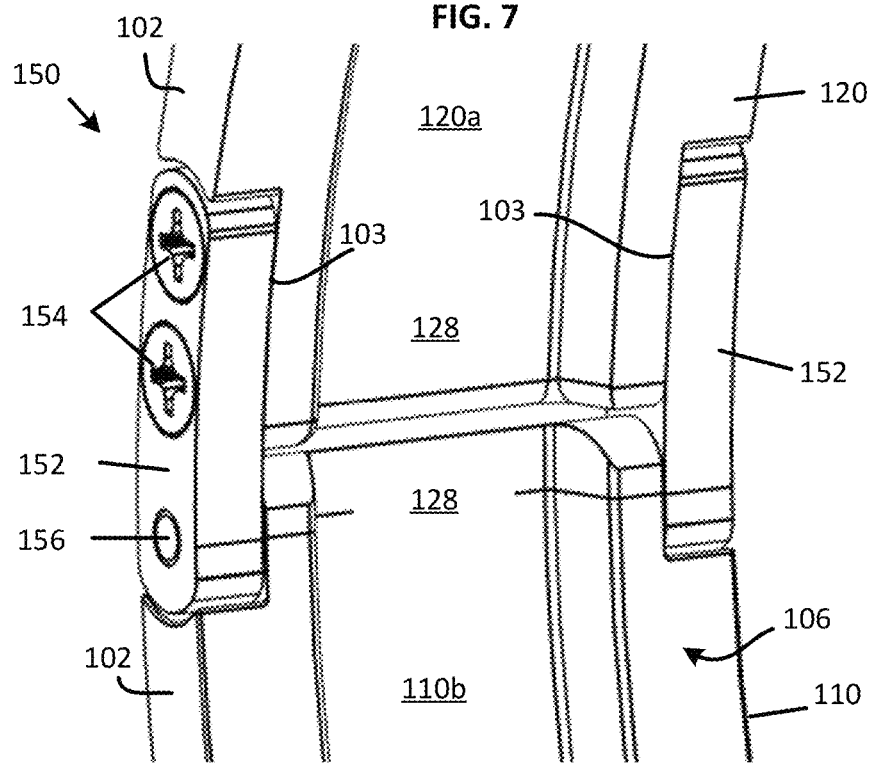
FIG. 7 is a perspective view showing an inside face of clamp sections, where adjacent clamp sections are pivotably connected with a hinge extending between the clamp sections, in accordance with an embodiment of the present disclosure.
Figure 8:
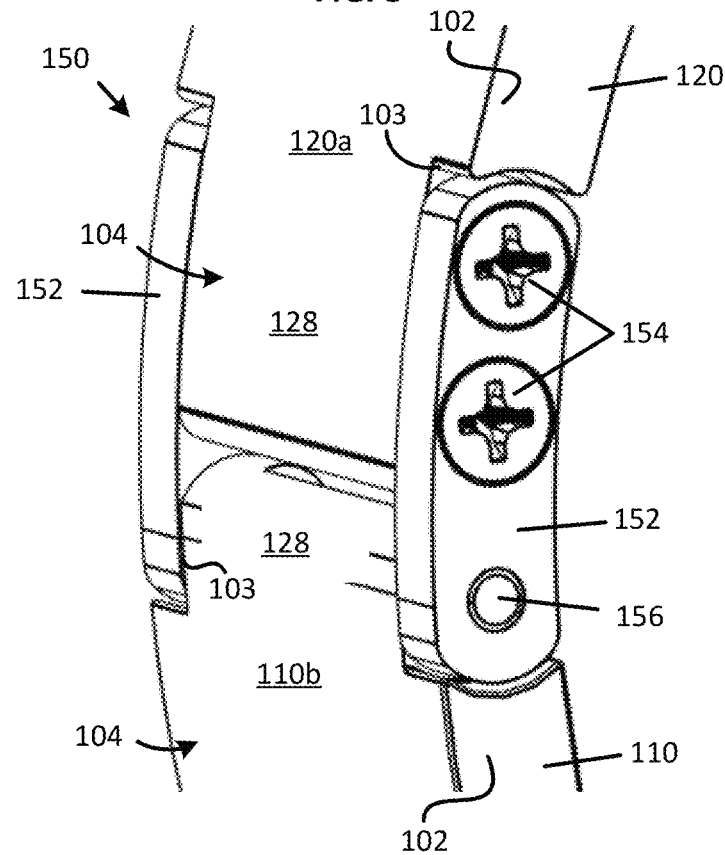
FIG. 8 is a perspective view showing an outside face of clamp sections and a hinge between the clamp sections, in accordance with an embodiment of the present disclosure.

FIGS. 7-8 show an inside face 106 and an outside face 104, respectively, of part of a V-band clamp 100 along a hinge 150 between a second end 110b of a first clamp section 110 and a first end 120a of a second clamp section, in accordance with an embodiment of the present disclosure. The hinge 150 includes hinge plates 152, fasteners 154, and hinge pins 156 as discussed above. Recesses 103 in lateral faces 102 of each clamp section result in a tongue 128 that has a reduced lateral width compared to the remainder of the first and second clamp sections 110, 120. Each hinge plate 152 is received in recesses 103 on the first and second clamp sections 110, 120 and is secured to the lateral faces 102 of the tongue 128. Each hinge plate 152 extends to connect the tongue 128 on the first clamp section 110 to the tongue 128 on the second clamp section 120. In some embodiments, the overlapping arrangement of tongues 128 and hinge plates 152 provides a rigid hinge with little or no torsional movement between the clamp sections 110, 120. Accordingly, when the V-band clamp 100 is moved to the closed position, the open ends (e.g., first end 110a and second end 120b) are properly aligned for relatively quick and easy installation of the fasteners 160 to retain the V-band clamp 100 in the closed position.

The lateral width of each tongue 128 and thickness of each hinge plate 152 can be selected so that the hinge plates 152 are flush with the lateral faces 102, inside face 106, and outside face 104 of the clamp sections 110, 120. Each hinge plate 152 can be curved with a radius of curvature equal to that of the clamp sections 110, 120. With dimensions and shape appropriately selected, each hinge plate 152 can approximate a continuous clamp section. In one embodiment, fasteners 154, such as machine screws, secure the hinge plate 152 to the side of one tongue 128, while a hinge pin 156 (e.g., a dowel pin, rivet, screw, etc.) is used to movably secure the hinge plate 152 to the side of the adjacent tongue 128. In the example shown, two machine screws are used to secure each hinge plate 152 to one tongue 128. In other embodiments, a single fastener or a hinge pin 156 may be used. In its assembled state, tongues 128 are between hinge plates 152, and each hinge plate 152 is flush with lateral faces 102 of the clamp sections 110, 120.

Figure 9:
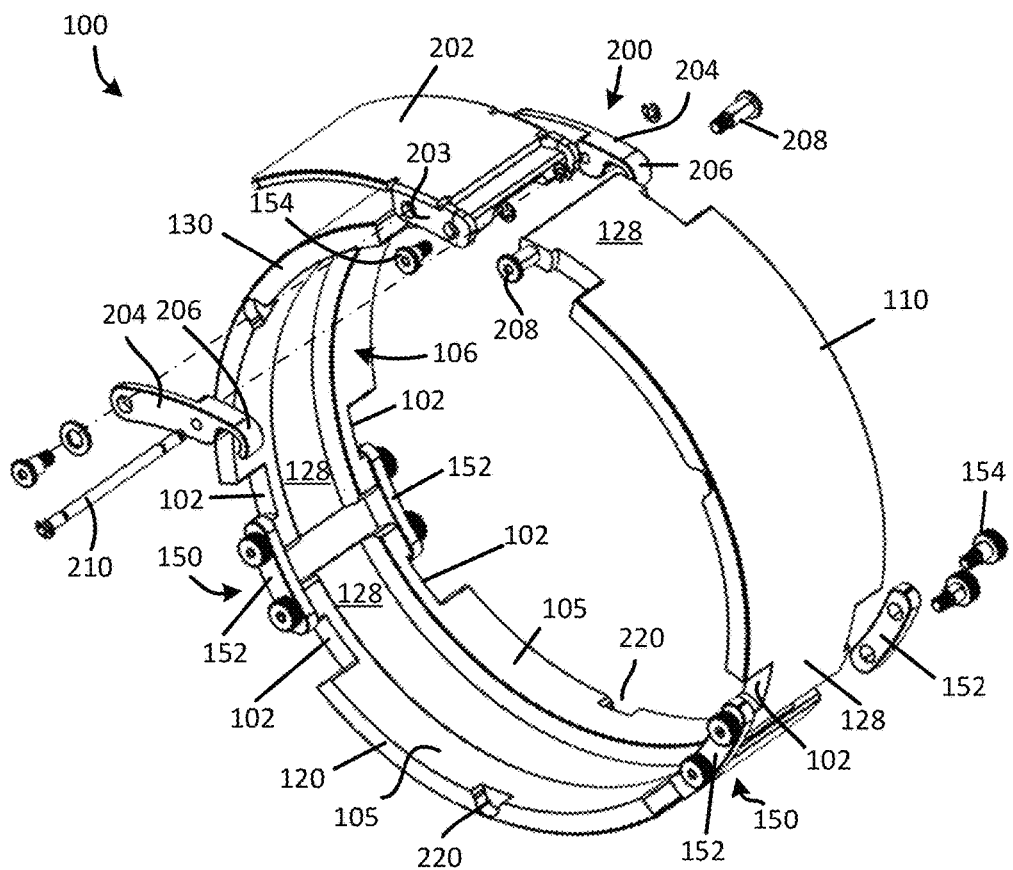
FIG. 9 illustrates a partially exploded, perspective view of a V-band clamp with a clasp-type closure, in accordance with another embodiment of the present disclosure.
Figure 10:
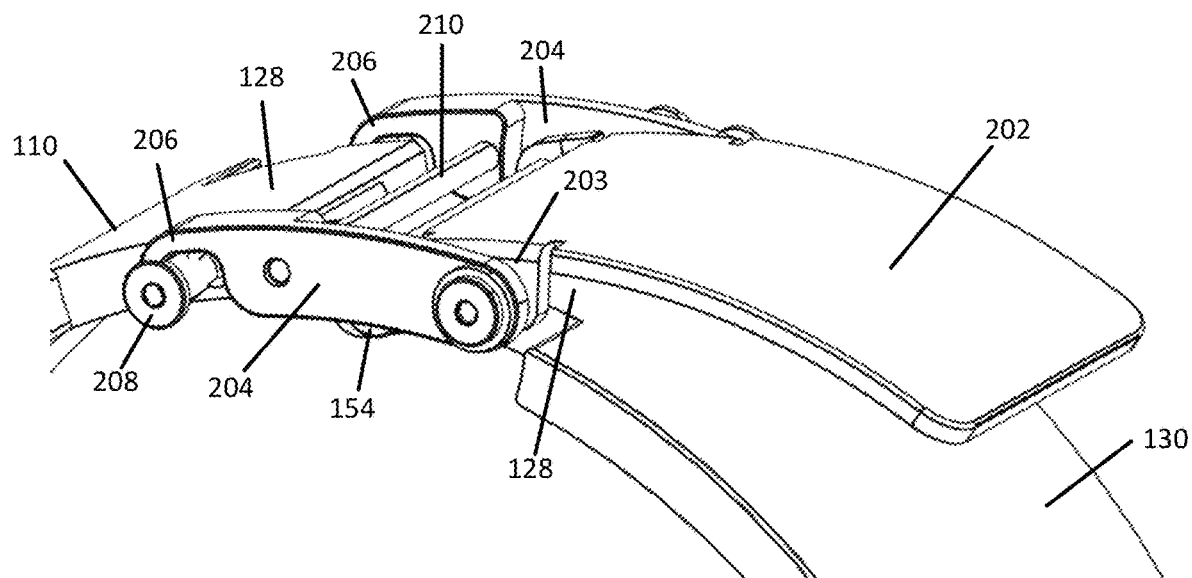
FIG. 10 is a close-up, perspective view showing the closure of FIG. 9, in accordance with an embodiment of the present disclosure.

Referring now to FIGS. 9-10, perspective views show a closure 200 as part of a V-band clamp 100, in accordance with an embodiment of the present disclosure. FIG. 9 shows a partially exploded perspective view of a V-band clamp 100 with a plurality of clamp sections and closure 200. In this example, the V-band clamp 100 includes a first clamp section 110, a second clamp section 120, and a third clamp section 130. In other embodiments, more or fewer clamp sections can be used, as will be appreciated. In some embodiments, the materials used to make the V-band clamp 100 may be sufficiently resilient to enable a single clamp section to be used (e.g., a band of metal or a polymer composite), where the clamp section can be opened to the extent necessary to install on a cylindrical joint. In other embodiments, the V-band clamp 100 includes, 2, 3, 4, or other number of clamp sections. Metals (e.g., aluminum, titanium, and stainless steel) can be used for various portions of the V-band clamp 100 to provide a rigid assembly, as desired.

In the example of FIG. 9, the first clamp section 110 is pivotably connected to the second clamp section 120 by a hinge 150 and the second clamp section 120 is pivotably connected to the third clamp section 130 by a hinge 150. The first clamp section 110 and the third clamp section 130 are releasably connected by the closure 200. Each hinge 150 includes hinge plates 152 connected to opposite lateral faces 102 of a tongue 128 defined in the end portion of the respective clamp section. Fasteners 154 extend through the hinge plate 152 and into the tongue 128 to pivotably connect the hinge plate 152 to the tongue 128. Optionally, a washer or bushing (not shown) may be used to facilitate movement between the clamp section and the hinge 150, although such components are not required.

Optionally, the V-band clamp 100 defines one or more recesses 220 in an inside face 106 of a clamp section, such as along lateral portions 105. Recesses 220 can be used to correctly orient the V-band clamp 100 on the joint. For example, recesses 220 on one side of the clamp section have a rectangular geometry while recesses 220 on the opposite side of the clamp section have a rounded geometry. When the V-band clamp 100 is installed on a joint with corresponding protrusions of a mating shape, the recesses 220 can be seated on the protrusions when the V-band clamp 100 is properly positioned.

In more detail, and with continued reference to FIG. 9, FIG. 10 illustrates a close-up perspective view of closure 200 as seen from an opposite side. The closure 200 includes a clasp 202 that is pivotably mounted to the tongue 128 of the third clamp section 130 using fasteners 154 extending axially into opposite sides of the tongue 128. For example, the clasp 202 includes side plates 203 that are similar in size and shape to the hinge plates 152 used in the hinge 150, in accordance with some embodiments. Arms 204 are pivotably mounted to the clasp 202 and include a hook 206 configured to engage a pin 208 or catch extending laterally outward from the tongue 128 of the first clamp section 110. Optionally, a clasp pin 210 extends between and connects the arms 204 so that they pivot as a single unit when the clasp 202 is operated between open and closed positions. In use, the clasp 202 can be pivoted away from the V-band clamp 100 (e.g., upward and away from third clamp section 130) so that the hooks 206 can engage the pins 208. After the hooks 206 are positioned on the pins 208, the clasp 202 can then be folded down against the third clamp section 130 to tighten the closure 200. In doing so, the lever action of the clasp 202 causes the arms 204 to draw the first clamp section 110 towards the third clamp section 130 and tighten the V-band clamp 100 by reducing the circumferential length of the V-band clamp 100. When the V-band clamp 100 is installed on a joint, this tightening action secures the V-band clamp 100 around the joint and retains the joint in a closed position.

Figure 11A:
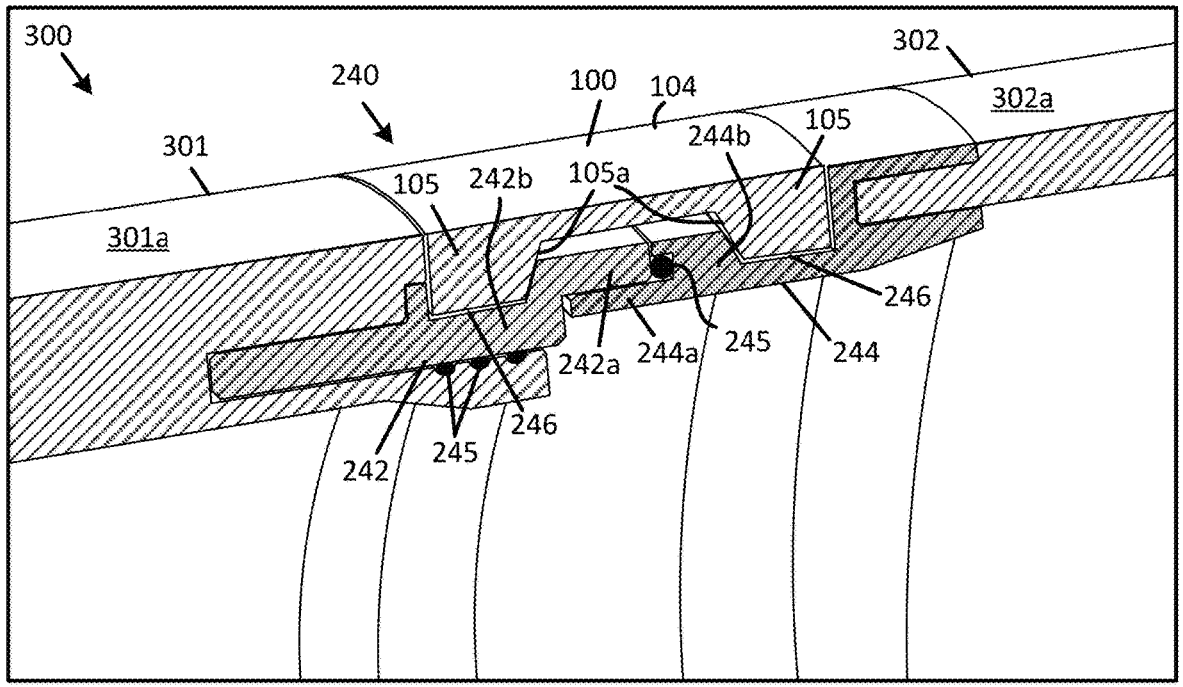
FIGS. 11A-11B illustrate cross-sectional views of a joint between cylindrical sections of an underwater vehicle with a V-band clamp installed on the joint, in accordance with some embodiments of the present disclosure.
Figure 11B:
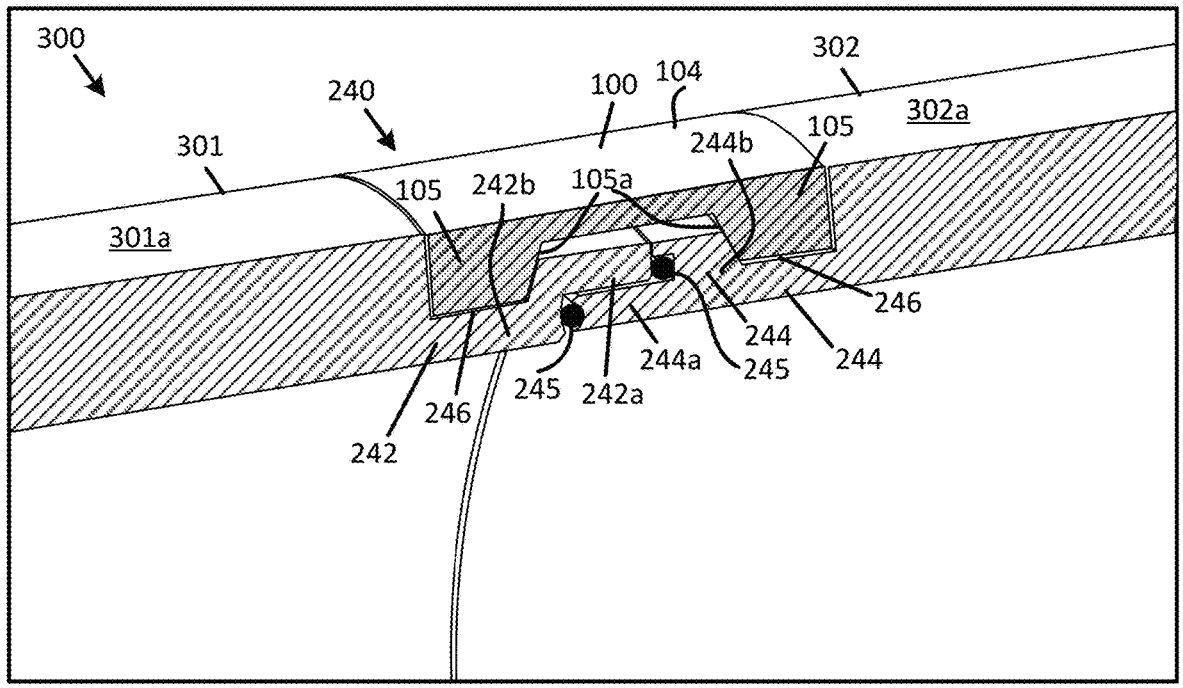

FIGS. 11A and 11B illustrate cross-sectional views of part of a joint 240 between first and second sections 301, 302 of an unmanned underwater vehicle (UUV) 300 with V-band clamp 100 installed, in accordance with an embodiment of the present disclosure. In FIG. 11A, the joint 240 includes first and second interfaces 242, 244, components that are separate from but secured to respective first and second sections 301, 302 of the UUV 300. In FIG. 11B, the first and second interfaces 242, 244 are integral to the respective first and second sections 301, 302 of the UUV 300. In either case, the V-band clamp 100 performs the same function of securing and drawing together the interfaces 242, 244. Accordingly, FIGS. 11A-11B are discussed concurrently below.

The first interface 242 includes a tongue portion 242a and body portion 242b that defines a recess 242c configured to receive the corresponding tongue portion 244a of the second interface 244. Similarly, the second interface 244 includes a tongue portion 244a and a body portion 244b defining a recess 244c configured to receive the corresponding tongue portion 242a of the first interface 242. In the assembled condition, the tongue portions 242a, 244a overlap. The tongue portion 242a of the first interface 242 extends to be in close proximity with the body portion 244b of the second interface 244. Similarly, the tongue portion 244a of the second interface 244 extends to be in close proximity with the body portion 242b of the first interface 242. Optionally, one or more O-rings 245 or gaskets can be positioned between the interfaces 242, 244, such as between tongue portion 242a of first interface 242 and body portion 244b of second interface 244.

Each interface 242, 244 further defines a channel 246 to receive a lateral portion 105 of the V-band clamp 100. In one embodiment, inner faces 105a of the lateral portions 105 are sloped to engage corresponding sloped faces on the interfaces 242, 244. As such, when the V-band clamp 100 is tightened around the joint 240, the inner faces 105a on the lateral portions 105 of the V-band clamp 100 cam the interfaces 242, 244 axially towards each other. In doing so, a seal can be formed between the V-band clamp 100 and the interfaces 242, 244 and/or between the interfaces 242, 244. When an O-ring 245 is present, the O-ring 245 can be compressed to form a water-tight seal between interfaces 242, 244. In some embodiments, as the V-band clamp 100 is tightened around the joint 240, the first section 301 and second section 302 of the UUV are drawn together to form a water-tight seal, where a reduction in the circumference of the V-band clamp 100 translates to axial force to tightly draw together adjacent sections of the UUV 300.

In other embodiments, the joint 240 can employ a tongue-and-groove interface, abutting surfaces, a sealing taper, a gasket seal, a plurality of O-rings 245, or other suitable configuration or combination of features to form a water-tight seal between interfaces 242, 244, and therefore between first section 301 and second section 302 of the UUV 300.

As can be seen in the examples of 11A and 11B, the V-band clamp 100 and joint 240 can be sized and configured so that the outside face 104 of the V-band clamp 100 is flush with, substantially flush with, or recessed compared to the outside surface 301a of the first section 301 and the outside surface 302a of the second section 302 of the UUV. For example, for a V-band clamp 100 having a diameter of 30 cm, the outside face 104 does not protrude radially beyond the outside surface 301a of the first or the outside surface 302a of the second section 302, and when recessed is recessed not more than 5 mm, not more than 3 mm, not more than 2 mm, or not more than 1 mm relative to the outside surfaces 301a, 302a. Accordingly, the V-band clamp 100 results in little or no additional drag on the UUV 300 compared to an otherwise continuous outer cylindrical surface of the UUV 300.

Figure 12:
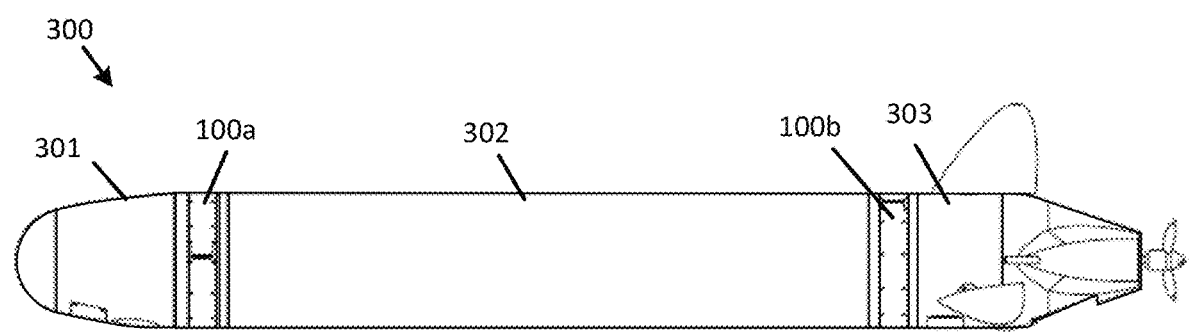
FIG. 12 is a side view of an underwater vehicle with first and second V-band clamps securing adjacent sections of the vehicle in an assembled state, in accordance with an embodiment of the present disclosure.

FIG. 12 illustrates a side view of a UUV 300 with a first section 301 (e.g., a nose section or front section), a second section 302 (e.g., a body section), and a third section 303 (e.g., a tail section or propulsion section), in accordance with an embodiment of the present disclosure. The UUV 300 has a first V-band clamp 100a between the first section 301 and the second section 302, and a second V-band clamp 100b between the second section 302 and the third section 303.

Figure 13A:
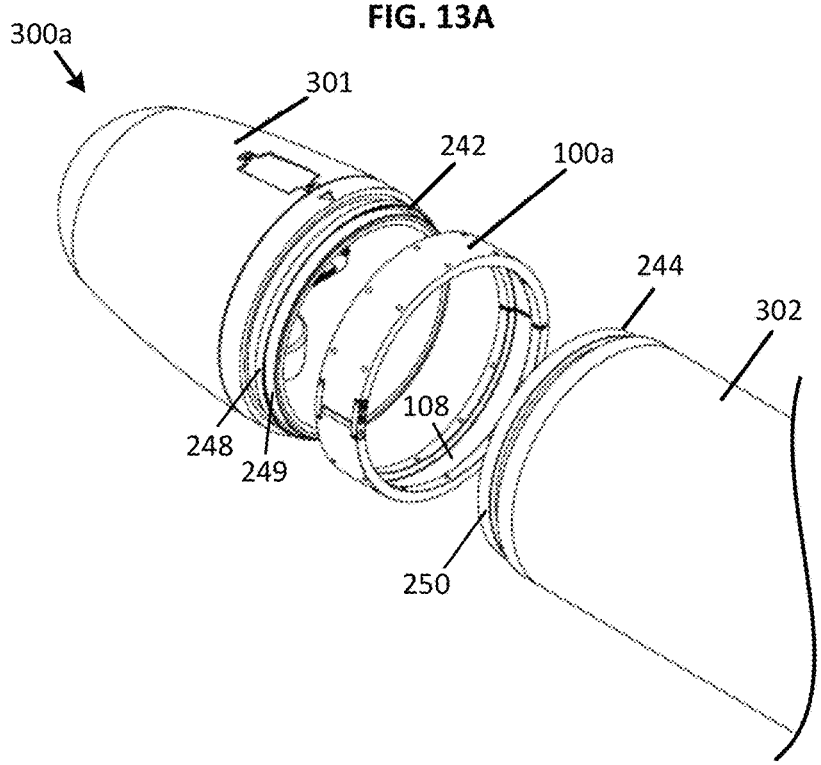
FIGS. 13A and 13B illustrate perspective views of a V-band clamp and sections of an underwater vehicle in a disassembled state, in accordance with some embodiments of the present disclosure.

FIG. 13A illustrates a perspective view showing a front part 300a of the UUV 300 of FIG. 12 in a disassembled state, in accordance with an embodiment of the present disclosure. The first section 301 is disassembled from the second section 302 and from first V-band clamp 100a. The first section 301 includes an integral first interface 242 configured to mate with the second interface 244 on the distal end of the second section 302. In this example, the first interface 242 includes a circumferential protrusion 248 adjacent a lip 249. When assembled, the second interface 244 on the distal end of the second section 302 overlaps the lip 249 so that a circumferential protrusion 250 on the second interface 244 abuts or is adjacent the circumferential protrusion 248 on the first interface 242 to form a water-tight seal. For example, the second interface 244 and lip 249 have a sealing taper. When assembled, the circumferential protrusions 248, 250 can then be received in the channel 108 defined in the first V-band clamp 100a.

Figure 13B:
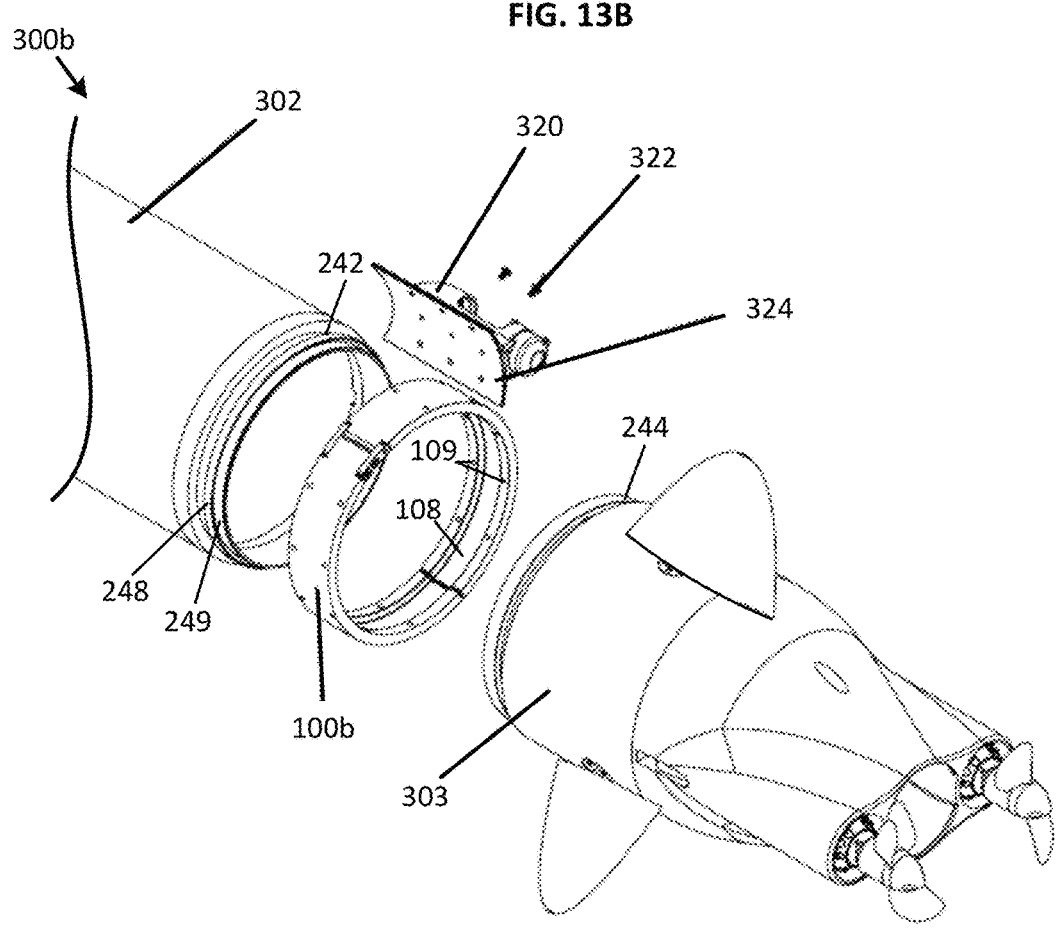

FIG. 13B illustrates a perspective view showing a rear part 300b of the UUV 300 of FIG. 12 in a disassembled state, in accordance with an embodiment of the present disclosure. The rear portion includes the second section 302, second V-band clamp 100b, third section 303, and accessory 320 configured to be mounted to the second V-band clamp 100b. Similar to the front part 300a, the proximal end of the second section 302 includes an integral first interface 242 configured to mate with the second interface 244 on the distal end of the second section 302. In this example, the first interface 242 includes a circumferential protrusion 248 adjacent a lip 249. When assembled, the second interface 244 on the third section 303 overlaps the lip 249 so that a circumferential protrusion 250 on the second interface 244 abuts or is adjacent the circumferential protrusion 248 on the first interface 242 to form a water-tight seal. For example, the second interface 244 and lip 249 have a sealing taper. The circumferential protrusions 248, 250 can then be received in the channel 108 defined in the second V-band clamp 100b. Tightening the second V-band clamp 100b axially draws together the first and second interfaces 242, 244 and retains the second section 302 coupled to the third section 303.

The accessory 320 can be a sonar device, a temperature sensor, a camera, a lifting handle, a tow hook, or other accessory that facilitates unmanned underwater activity, for example. In this example, the accessory 320 includes a mounting plate 324 with holes arranged to align with fastener openings 109 on the second V-band clamp 100b. Fasteners 322 can be installed through the mounting plate 324 and into the fastener openings 109 to secure the accessory 320 to the second V-band clamp 100b. One or more accessories 320 can be mounted to the either or both of the first and second V-band clamps 100a, 100b.

V-band clamp 100 as variously described herein can be made of anodized aluminum, titanium, stainless steel, a reinforced polymer composite, or any other suitable material. In some embodiments, V-band clamp 100 can be made of rigid materials, such as metal, to facilitate camming action of the interfaces 242, 244 of a joint 240. In other embodiments, V-band clamp 100 can be made of flexible materials that are inelastic or of limited elasticity, such as a polymer composite, such that the V-band clamp 100 maintains sufficient sealing pressure on the joint 240 when tightened.

In use, some embodiments of the V-band clamp 100 as variously described in the present disclosure advantageously feature clamp sections 110, 120, a hinge 150, and captive fasteners 160 in a single assembly of attached parts. As such, installation of the V-band clamp can be simplified by avoiding loose fasteners and unattached clamp sections. For example, the V-band clamp 100 can be handled as a single component that allows simplified opening, closing, installing, and tightening. Additionally, some embodiments of the V-band clamp 100 are particularly suited for use on an underwater vehicle due to having low aerodynamic drag when installed on the joint between vehicle sections. The materials and dimensions of the V-band clamp 100 can be selected to provide for a rigid structure that securely retains together joint components in a water-tight seal. Further, by avoiding protruding hinge or fasteners, the installed V-band clamp 100 can be flush with the outside surface of the underwater vehicle. Numerous variations and embodiments will be apparent in light of the present disclosure.

FURTHER EXAMPLE EMBODIMENTS

The following examples pertain to further embodiments, from which numerous permutations and configurations will be apparent.

Example 1 is a V-band clamp comprising a first clamp section and a second clamp section, the first and second clamp sections each having an arcuate shape with a first end and a second end, and having an inside surface defining a recessed channel; a hinge pivotably connecting the second end of the first clamp section to the first end of the second clamp section; and at least one fastener configured to releasably connect the first end of the first clamp section to the second end of the second clamp section in a closed position, wherein when in the closed position the at least one fastener extends through an opening in an end face on the first end of the first clamp section and into a bore in an end face on the second end of the second clamp section.

Example 2 includes the subject matter of Example 1, wherein the at least one fastener includes a threaded end portion and wherein the bore in the end face on the second end of the second clamp section is a threaded bore configured to engage the threaded end portion of the at least one fastener.

Example 3 includes the subject matter of Examples 1 or 2, wherein the hinge includes hinge plates extending in a circumferentially direction between and connecting the first and second clamp sections, each hinge plate connected to the second end of the first clamp section and to the first end of the second clamp section, and each hinge plate being substantially flush with side faces of the first and second clamp sections.

Example 4 includes the subject matter of Example 3, wherein a first end of each hinge plate is fixedly secured to one of the first clamp section or the second clamp section, and wherein a second end of each hinge plate is pivotably secured to the other of the first clamp section or the second clamp section.

Example 5 includes the subject matter of Example 3 or 4, wherein each hinge plate is substantially flush with side faces, inside faces, and outside faces of the first and second clamp section.

Example 6 includes the subject matter of any of Examples 1-5, wherein each at least one fastener is captive to the first clamp section.

Example 7 includes the subject matter of Example 6, wherein each at least one fastener is partially retained in a pocket hole in the first clamp section.

Example 8 includes the subject matter of any of Examples 1-7, wherein in the closed position, the V-band clamp defines a circumferential gap between the first end of the first clamp section and the second end of the second clamp section.

Example 9 includes the subject matter of any of Examples 1-8, wherein at least one of the first and second clamp sections defines bores extending in a radial direction.

Example 10 includes the subject matter of Example 9, wherein the bores are threaded bores.

Example 11 is a V-band clamp comprising a plurality of arcuate clamp sections each having a first end portion and a second end portion, wherein the plurality of arcuate clamp sections are movably linked together from a first clamp section to a last clamp section such that the second end portion of one the plurality of arcuate clamp sections is adjacent the first end portion of an adjacent one of the plurality of arcuate clamp sections, and wherein the plurality of arcuate clamp sections defines a continuous channel along an entire inside surface of the V-band clamp; and a fastener configured to releasably connect the first end portion of the first clamp section to the second end portion of the last clamp section, the fastener including a head portion of a first diameter, a shaft portion of a smaller second diameter, and a threaded portion on an end of the shaft portion and having a third diameter greater than the second diameter; wherein the first end portion of the first clamp section defines a pocket hole through an end face of the first end portion, the pocket hole having a first bore sized and configured to accept the head portion and a threaded through-bore configured to engage threads of the threaded portion of the fastener; and wherein the second end portion of the last clamp section has an end face defining a threaded bore extending into the end face, the threaded bore configured to engage the threaded portion of the fastener.

Example 12 includes the subject matter of Example 11, wherein the plurality of arcuate clamp sections substantially defines a closed circular shape when the fastener connects the first end of the first clamp section to the second end of the last clamp section.

Example 13 includes the subject matter of Examples 11 or 12, wherein each of the plurality of arcuate clamp sections defines part of a circle.

Example 14 includes the subject matter of any of Examples 11-13, wherein the head portion of the fastener is within the pocket hole when the fastener connects the first clamp section to the last clamp section.

Example 15 includes the subject matter of any of Examples 11-14, wherein the plurality of arcuate clamp sections includes only the first clamp section and the last clamp section, the first clamp section and the last clamp section each having a semicircular shape.

Example 16 includes the subject matter of Example 15 and further comprises a hinge connecting the second end of the first clamp section to the first end of the second clamp section.

Example 17 is an underwater vehicle comprising a first vehicle section, a second vehicle section abutting the first vehicle section to define a joint, and the V-band clamp of any of Examples 1-16 in the closed position around the joint.

Example 18 includes the subject matter of Example 17, wherein the underwater vehicle includes a first vehicle section and a second vehicle section joined in abutment with the V-band clamp, wherein an outside surface of the V-band clamp is flush with an outside surface of the underwater vehicle.

Example 19 includes the subject matter of Example 17 or 18, wherein the underwater vehicle has a cylindrical shape with a diameter from 6 cm to 35 cm.

Example 20 includes the subject matter of Example 19, wherein the diameter is from 10 cm to 30 cm.

Example 21 is an underwater vehicle comprising a first vehicle section with a first outside surface and a first flange on a cylindrical first end, the first flange having a first radially outer face that is recessed with respect to the first outside surface of the first vehicle section; a second vehicle section with a second outside surface and a second flange on a cylindrical second end, the second flange having a second radially outer face that is recessed with respect to the second outside surface of the second vehicle section; and a V-band clamp including a first clamp section hingedly connected to a second clamp section, the V-band clamp configured to extend around the first flange and the second flange in a closed configuration in which the first radially outer face and the second radially outer face are received in a channel defined along an inside of the V-band clamp; wherein in an installed condition, an entirety of the v-band clamp is flush with or recessed with respect to the first outside surface and the second outside surface.

Example 22 includes the subject matter of Example 21, wherein the V-band clamp defines threaded openings extending radially into at least one of the first clamp section and the second clamp section.

Example 23 includes the subject matter of Examples 21 or 22, wherein in the installed condition, the V-band clamp defines a circumferential gap between the first end of the first clamp section and the second end of the second clamp section.

Example 24 includes the subject matter of any of Examples 21-23 and further comprises a fastener extending between and connecting the first end of the first clamp section to the second end of the second clamp section when the V-band clamp is in the closed configuration.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A V-band clamp comprising:
   a first clamp section and a second clamp section, the first and second clamp sections each having an arcuate shape with a first end and a second end, and having an inside surface defining a recessed channel;

a hinge pivotably connecting the second end of the first clamp section to the first end of the second clamp section; and at least one fastener configured to releasably connect the first end of the first clamp section to the second end of the second clamp section in a closed position, wherein when in the closed position the at least one fastener extends through an opening in an end face on the first end of the first clamp section and into a bore in an end face on the second end of the second clamp section;

wherein the hinge includes hinge plates extending in a circumferential direction between and connecting the first and second clamp sections, each hinge plate connected to the second end of the first clamp section and to the first end of the second clamp section, and each hinge plate being substantially flush with side faces of the first and second clamp sections; and wherein a first end of each hinge plate is fixedly secured to one of the first clamp section or the second clamp section, and wherein a second end of each hinge plate is pivotably secured to the other of the first clamp section or the second clamp section.

2. The V-band clamp of claim 1, wherein the at least one fastener includes a threaded end portion and wherein the bore in the end face on the second end of the second clamp section is a threaded bore configured to engage the threaded end portion of the at least one fastener.

3. The V-band clamp of claim 1, wherein each hinge plate is substantially flush with side faces, inside faces, and outside faces of the first and second clamp section.

4. The V-band clamp of claim 1, wherein each at least one fastener is captive to the first clamp section.

5. The V-band clamp of claim 4, wherein each at least one fastener is partially retained in a pocket hole in the first clamp section.

6. The V-band clamp of claim 1, wherein in the closed position, the V-band clamp defines a circumferential gap between the first end of the first clamp section and the second end of the second clamp section.

7. The V-band clamp of claim 1 wherein at least one of the first and second clamp sections defines bores extending in a radial direction, and wherein the bores are threaded bores.

8. A vehicle configured for underwater travel, the vehicle comprising:
a first vehicle section;
a second vehicle section abutting the first vehicle section to define a joint; and
the V-band clamp of claim 1 in the closed position around the joint between the first vehicle section and the second vehicle section.

9. An underwater vehicle comprising:
a first vehicle section with a first outside surface and a first flange on a cylindrical first end, the first flange having a first radially outer face that is recessed with respect to the first outside surface of the first vehicle section;

a second vehicle section with a second outside surface and a second flange on a cylindrical second end, the second flange having a second radially outer face that is recessed with respect to the second outside surface of the second vehicle section; and a V-band clamp comprising:
a first clamp section and a second clamp section, the first and second clamp sections each having an arcuate shape with a first end and a second end, and having an inside surface defining a recessed channel;

a hinge pivotably connecting the second end of the first clamp section to the first end of the second clamp section; and at least one fastener configured to releasably connect the first end of the first clamp section to the second end of the second clamp section in a closed position, wherein when in the closed position the at least one fastener extends through an opening in an end face on the first end of the first clamp section and into a bore in an end face on the second end of the second clamp section;

wherein the hinge includes hinge plates extending in a circumferential direction between and connecting the first and second clamp sections, each hinge plate connected to the second end of the first clamp section and to the first end of the second clamp section, and each hinge plate being substantially flush with side faces of the first and second clamp sections; and wherein a first end of each hinge plate is fixedly secured to one of the first clamp section or the second clamp section, and wherein a second end of each hinge plate is pivotably secured to the other of the first clamp section or the second clamp section;

wherein in an installed condition, an entirety of the V-band clamp is flush with or recessed with respect to the first outside surface and the second outside surface.

10. The underwater vehicle of claim 9, wherein the V-band clamp defines threaded openings extending radially into at least one of the first clamp section and the second clamp section.

11. The underwater vehicle of claim 9, wherein in the installed condition, the V-band clamp defines a circumferential gap between the first end of the first clamp section and the second end of the second clamp section.

12. The underwater vehicle of claim 9, further comprising a fastener extending between and connecting the first end of the first clamp section to the second end of the second clamp section when in the closed configuration.

* * * * *